United States Patent [19]

Moro et al.

[11] Patent Number: 5,097,273

[45] Date of Patent: Mar. 17, 1992

[54] RECORDING MEDIUM DETECTING APPARATUS

[75] Inventors: Fuminori Moro, Machida; Hiroshi Tomita, Sagamihara, both of Japan

[73] Assignee: Minolta Camera Kabushiki Kaisha, Osaka, Japan

[21] Appl. No.: 575,445

[22] Filed: Aug. 30, 1990

[30] Foreign Application Priority Data

Sep. 4, 1989 [JP] Japan .............................. 1-103177[U]
Sep. 4, 1989 [JP] Japan .............................. 1-103178[U]
Sep. 4, 1989 [JP] Japan .............................. 1-227533

[51] Int. Cl.⁵ .................. G01D 15/24; B65H 7/02; G03G 21/00
[52] U.S. Cl. ................................ 346/134; 271/258; 355/308
[58] Field of Search .............. 346/134, 135.1, 160; 355/308, 309, 316, 317; 271/263, 258, 265

[56] References Cited

U.S. PATENT DOCUMENTS 4,968,015 11/1990 Calverley et al. .................. 271/265
5,007,628 4/1991 Skinner ................................ 271/263

FOREIGN PATENT DOCUMENTS

0141336 9/1982 Japan ................................... 271/263
61-25283 6/1986 Japan .
0192647 8/1989 Japan ................................... 271/263

*Primary Examiner*—Benjamin R. Fuller
*Assistant Examiner*—David Yockey
*Attorney, Agent, or Firm*—Willian Brinks Olds Hofer Gilson & Lione

[57] ABSTRACT

A recording medium detecting apparatus detects the fact that a recording medium has been conveyed to an image forming part of a laser beam printer. The image forming part is provided with a driving roller for producing a rotational motion and a following roller held in pressed contact with the driving roller and consequently allowed to follow the rotational motion. The thrust of the recording medium in between the two rollers is discriminated by the detection of a change in the rotational speed of the driving roller which change is caused by the thrust of the recording medium in between the rollers. In accordance with the result of detection of this thrust, the timing for image formation in the image forming part is controlled. Thus, the arrival of the recording medium at a prescribed destination can be detected without requiring use of a sensor or a switch. Where a plurality of recording media are conveyed in a superposed state, the number of these recording media can be discriminated by detecting the amount of change in the rotation speed. The display part for displaying the residual amount of recording media is controlled in accordance with the number of recording media involved in the thrust. The display part tells the operator the residual amount of recording media.

11 Claims, 6 Drawing Sheets

RECORDING MEDIUM DETECTING APPARATUS

BACKGROUND OF THE INVENTION

1. Field of the Invention

This invention relates to a recording medium detecting apparatus which, in an image forming system such as a laser beam printer, serves the purpose of detecting termination of the conveyance of a recording medium, namely a recording paper sheet, at a prescribed destination.

2. Description of the Related Art

In an image forming system such as a laser beam printer, sheets of a recording medium stowed as piled up in a paper feeding magazine are supplied one by one to an image forming part, in which a given image is inscribed on the recording medium. The recording medium is generally used in the form of separate sheets of a prescribed length, which sheets of recording medium are stowed as piled up in a magazine.

In the laser beam printer, for example, the image forming part has a driving drum for conveying a recording paper sheet supplied from the magazine mentioned above and a conveying roller to transfer the recording paper therebetween and impart a forward motion to the recording paper sheet. Since the formation of an image on the recording paper sheet must be carried out at a prescribed timing with reference to the motion of the recording paper sheet in conveyance, infallible detection of the arrival of the leading end of a recording paper sheet at a prescribed position in the image forming part constitutes an essential requirement.

Where the inscription of an image on the recording paper sheet in the image forming part is effected by exposing the recording paper sheet to a laser beam, a microswitch or a photosensor cannot be used for the detection of the leading end of the recording paper sheet because the surface of the recording paper sheet is coated with a photosensitive material. This is because the use of such a detecting device has the possibility of inflicting a flaw or inducing fogging on the surface of the recording paper sheet.

For the purpose of discriminating between the normal departure for the image forming part of just one recording paper sheet and the abnormal departure therefore of two or more recording paper sheets in a superposed state, Japanese Patent Laid-Open 61-25,283 discloses a technique which, on the fact that one of a pair of rollers moves away from the other roller at the time that a recording paper sheet is being nipped therebetween, detects the position of the motion of the roller by means of a light-receiving element.

When the technique of this principle is employed for the detection of the arrival of the leading end of a recording paper sheet at the prescribed position in the image forming part, however, when the recording paper sheet advances to the position of the conveying roller and consequently, one of the pair of rollers is set into motion, the light-receiving element for detecting the light projected toward the one roller mentioned above is induced to detect the entry of the recording sheet in response to the motion of the roller. Thus, the technique under discussion, when used for this purpose, entails the disadvantage that stable detection of the recording paper sheet is not obtained because of possible uneven rotation of the roller shaft and possible tolerance in fabrication.

SUMMARY OF THE INVENTION

An object of this invention is to provide a recording medium detecting apparatus which can detect termination of the conveyance of a recording paper sheet to a prescribed position as in an image forming part without inflicting any flaw on the recording paper sheet.

Another object of this invention is to provide a recording medium detecting apparatus which detects termination of the conveyance of a recording medium to the position of a pair of rotating members serving to convey the recording medium in accordance with a change in the rotating speed of a motor for driving the pair of rotating members and which, therefore, effects the detection of the arrival of the recording medium at the prescribed position without using a microswitch or a photosensor.

A further object of this invention is to provide a recording medium detecting apparatus which in case where a plurality of sheets of the recording medium are conveyed to the stated position as in the image forming part, detects exactly the number of sheets conveyed as superposed.

Still another object of this invention is to provide a recording medium detecting apparatus which, in case where a plurality of superposed sheets of the recording medium reach the prescribed position as in the image forming part with the leading ends thereof in a coincident state or in a mutually incoincident state, detects exactly the number of sheets of the recording medium conveyed as superposed.

Yet another object of this invention is to provide a recording medium detecting apparatus which permits the remaining amount of the recording medium to be calculated by detecting the used amount of the recording medium.

According to the present invention, there is provided a sheet detecting apparatus, comprising sheet conveying means provided with a first rotating member which is rotatively driven by driving means and a second rotating member held in pressed contact with said first rotating member and consequently allowed to follow a first rotating member rotation, detecting means for detecting the rotational speed of at least one of said first and second rotating members and outputting a detection signal corresponding to said rotational speed, and discriminating means for judging, based on a change in said detection signal, the fact that the leading end of a sheet has thrust in between said first rotating member and said second rotating member.

DESCRIPTION OF THE PREFERRED EMBODIMENTS

Figure 1:
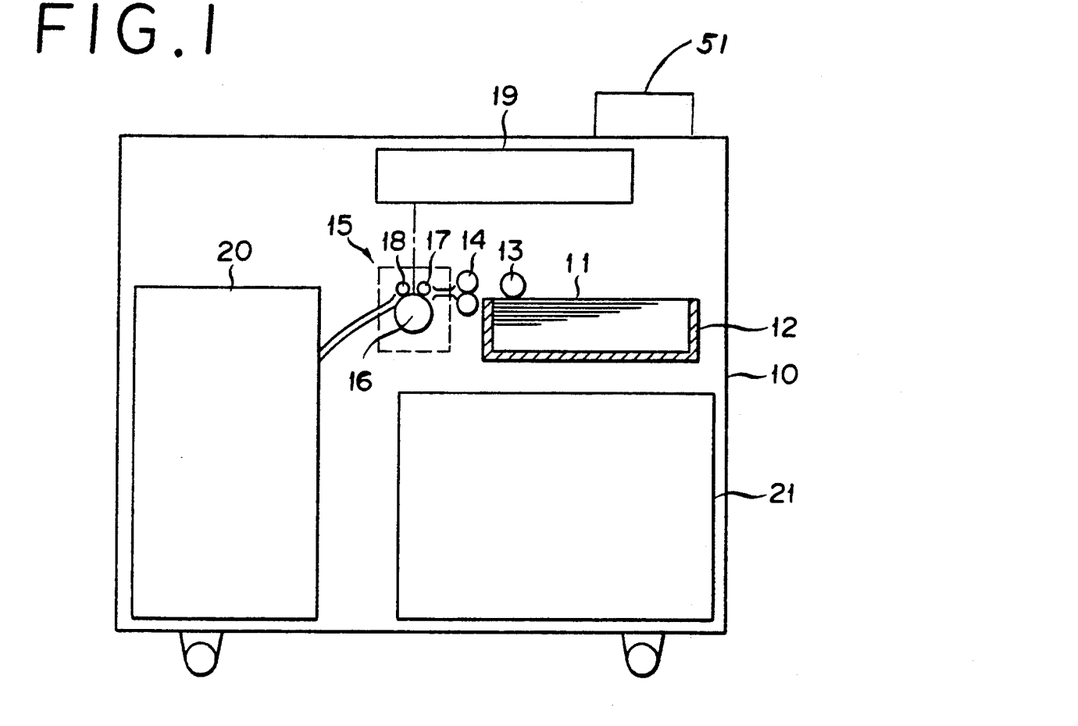
FIG. 1 is a schematic cross section illustrating an image forming system in which a typical recording medium detecting apparatus of the present invention is embodied.

As illustrated in FIG. 1, a magazine 12 for accommodating sheets of recording medium, namely recording paper sheets, is detachably set in place inside a casing 10 of a laser beam printer. The recording paper sheets 11 held inside the magazine 12 are played out by a paper feeding roller 13 in the direction of a pair of conveying rollers 14 and are further advanced thence to an image forming part 15.

The image forming part 15 is provided with a driving drum 16 and two conveying rollers 17, 18 held in pressed contact therewith and opposed to each other across a prescribed gap. It is through the part of this gap that a laser beam from an optical unit 19 impinges on the portion of a recording paper sheet 11 intervening between the conveying rollers 17, 18 and the driving drum 16. The recording paper sheet 11 on which a given image has been consequently inscribed is introduced into a developing unit 20. In FIG. 1, the reference numeral 21 stands for a combination power source and controlling part.

Figure 2:
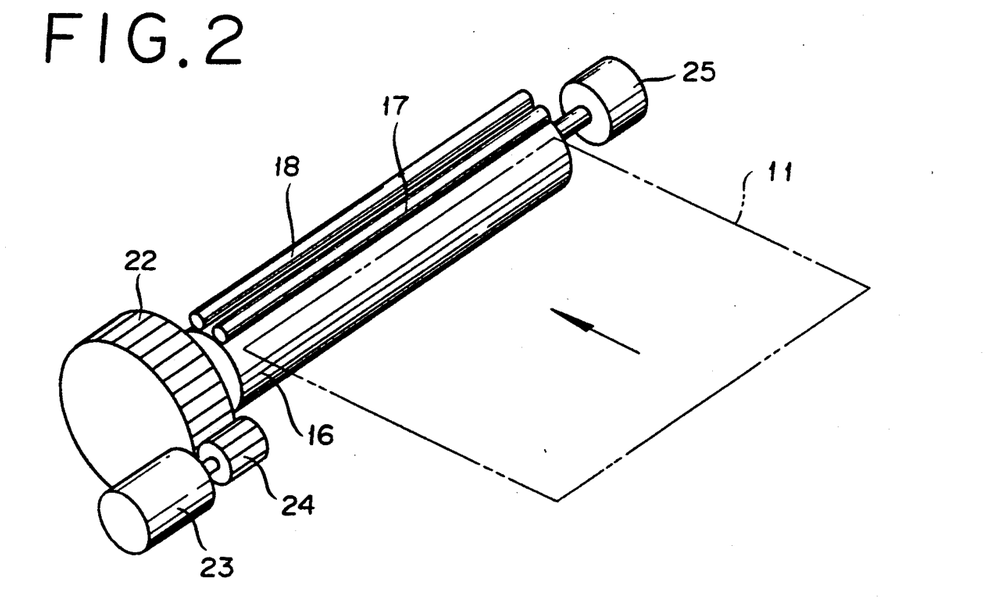
FIG. 2 is a magnified perspective view illustrating the image forming part shown in FIG. 1.

The image forming part 15 is illustrated as magnified in FIG. 2. For the purpose of imparting a motion to the driving drum 16, a toothed wheel 22 connected directly to the drum 16 and a toothed wheel 24 fixed to the main shaft of a driving motor 23 are kept in mesh. The toothed wheel 22 connected directly to the driving drum 16 is given a larger diameter than that of the toothed wheel 24 fixed to the main shaft of the driving motor 23. The reason for this relationship of diameters is that, owing to the mechanism capable of reducing the revolution number of the motor 23 and consequently enabling a correspondingly reduced rotation to be transmitted to the driving drum 16, the rotation number of the motor 23 is allowed to be set at a large value and the transmission of the rotation of the motor 23 to the driving drum 16 is accomplished with the vibration of the motor 13 depressed even when the conveying speed of the recording paper sheet 11 is slow. The large diameter of the toothed wheel 22 is additionally intended to stabilize the rotation of the driving drum 16 owing to the proportionately large inertia of the toothed wheel 22. In place of these toothed wheels 22, 24, two pulleys may be positioned as separated from each other and interconnected with a belt adapted to transmit their rotations. The driving motor 23 mentioned above is a stepping motor in kind. It may be otherwise a DC motor, for example.

For detection of an uneven rotation of the driving drum 16, an encoder 25 is connected to the driving drum 16.

Figure 3:
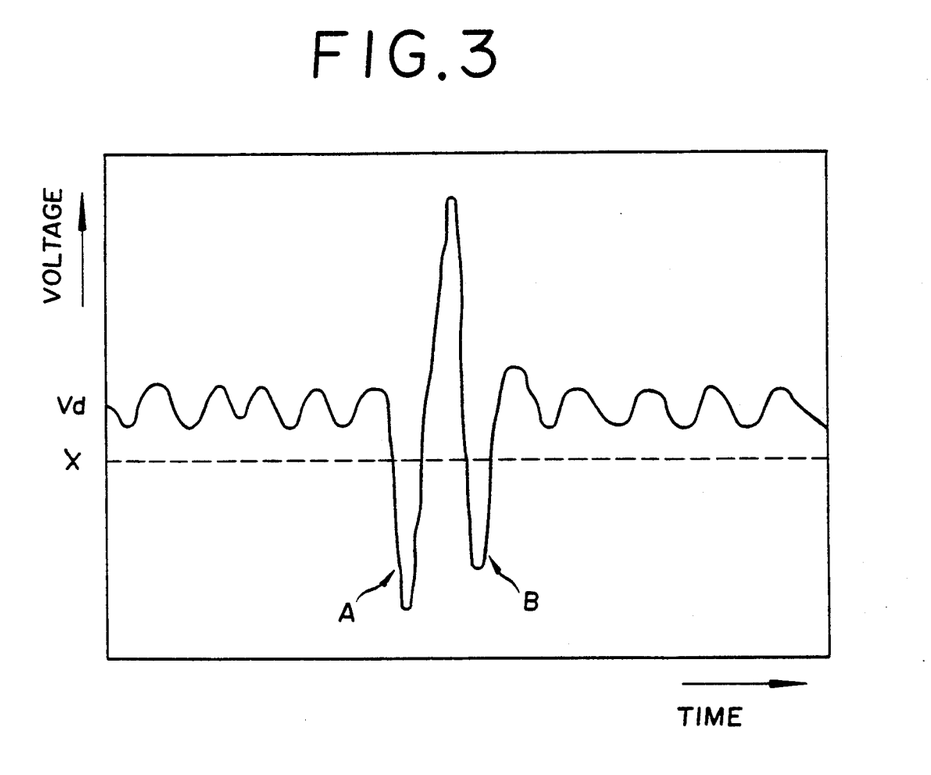
FIG. 3 is a graph showing the condition of occurrence of uneven rotation of a rotary member.

FIG. 3 is a graph showing a typical result of the observation with an oscilloscope of the output data from the encoder 25 mentioned above. In FIG. 3, the horizontal axis represents the course of the time and the vertical axis represents the magnification of a part of fluctuation in the output pulse from the encoder 25 as converted into the voltage. The motor 23 is prone to constant fluctuation of torque. Moreover, because of tolerances of fabrication and tolerances of assembly incurred by the toothed wheels 22, 24, the conveying rollers 17, 18, etc., more or less uneven rotation occurs in the driving drum 16 as shown in FIG. 3. When the recording paper sheet 11 is nipped in between the driving drum 16 and the conveying roller 17, however, the uneven rotation of the driving drum 16 is aggravated as compared with that existing during the course of the steady state. The same thing occurs when the recording paper sheet 11 is nipped in between the conveying roller 18 and the driving drum 16. In FIG. 3, the reference symbol A stands for an uneven rotation produced by the driving drum 16 when the recording paper sheet 11 thrusts in between the driving drum 16 and the conveying roller 17 and the reference symbol B for an uneven rotation similarly produced when the leading end of the same recording paper sheet 11 thrusts into the other conveying roller 18. The uneven rotation B is smaller than the uneven rotation A because the recording paper sheet 11 is already nipped by the driving drum 16 when the latter disturbance B is suffered to occur. Thus, by the conveyance of one recording paper sheet 11, detection of the leading end of the recording paper sheet 11 can be attained twice.

The large fluctuation of the uneven rotation during the thrust of a recording paper sheet 11 is ascribed to the fact that the thrust of the recording paper sheet 11 in between the driving drum 16 and the conveying roller 17 adds to the force of pressed contact and consequently increases the load exerted on the motor.

The encoder 25 monitors the uneven rotation of the driving drum 16 with reference to a prescribed value exceeding the uneven rotation of the driving drum 16 produced during the course of the steady state taken as the threshold X shown in FIG. 3 and, on detecting the occurrence of an output voltage falling below the threshold X, discerns the fact that the recording paper sheet 11 has thrust in the driving drum 16. In the image forming part 15 constructed as illustrated in FIG. 2, since the uneven rotation grows past the threshold twice as shown in FIG. 3, the leading end of the recording paper sheet 11 is judged to have reached the image forming part 15 at the time that the voltage level has surpassed the threshold X for the first time. Optionally, the encoder 25 may be readapted so as to detect the uneven rotation of the conveying roller 17 instead of that of the driving drum 16.

It should be noted, however, that though FIG. 3 represents the magnification of a part of the rotation of the driving drum 16 from the time the rotation assumes a steady state until the time it resumes a steady state past the time it fluctuates and consequently allows detection of the leading end of the recording paper sheet 11, the rotation is actually susceptible of a disturbance such as the vibration which possibly occurs when the operation of the motor 23 is initiated or when the recording paper sheet is started from the magazine. When this disturbance occurs at all, it compels the output voltage level of the encoder 25 to surpass the threshold. In the laser beam printer under discussion, therefore, a timer or other similar device is incorporated for the purpose of allowing the output value of the encoder 25 to be detected exclusively during prescribed lengths of time except for those expected to occasion a disturbance.

Figure 4:
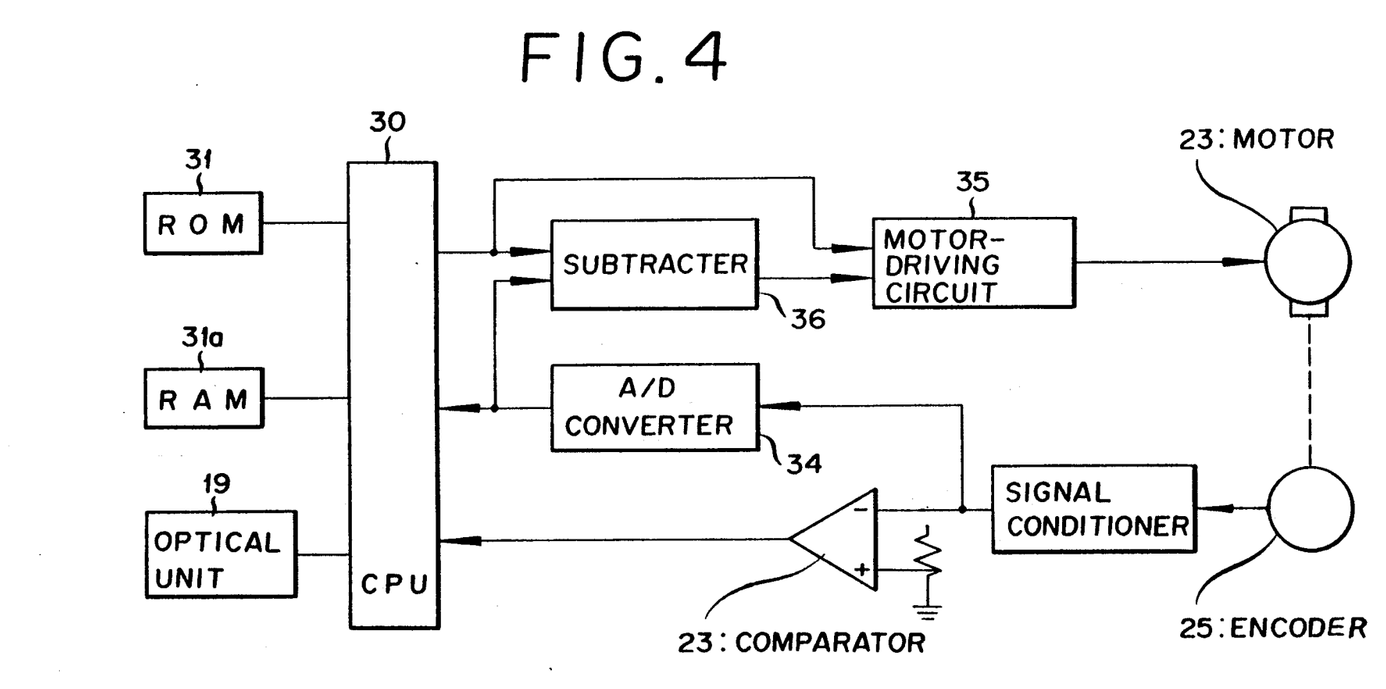
FIG. 4 is a block diagram illustrating a control circuit for the image forming system.

FIG. 4 is a block diagram illustrating a control circuit for the laser beam printer. A memory device such as a ROM 31 or a RAM 31a for storing control data is connected to a microprocessor CPU 30 so as to forward a control signal to the optical unit 19 shown in FIG. 1.

Figure 5:
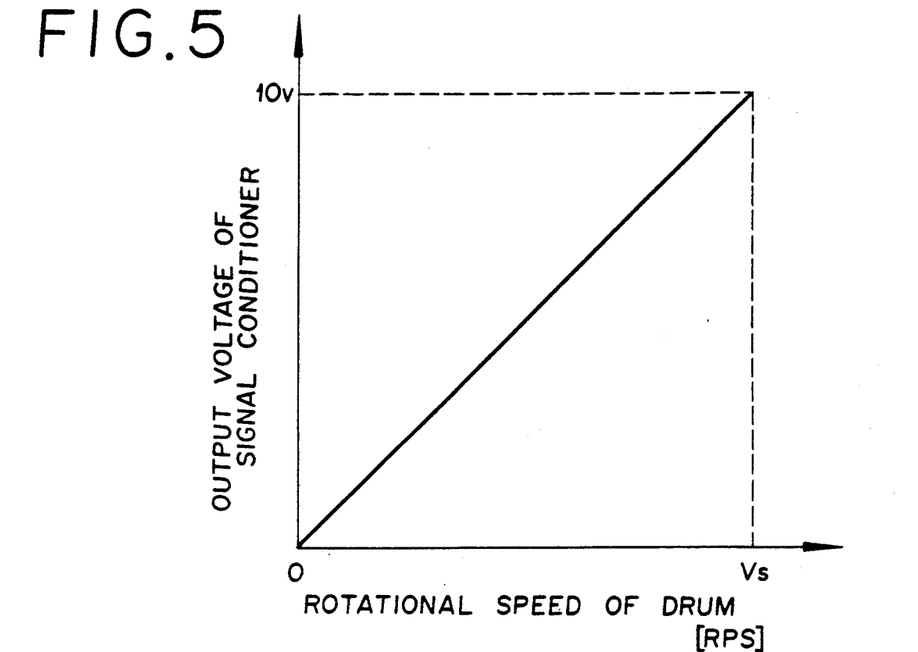
FIG. 5 is a characteristic curve diagram showing the relation between the rotational speed of a rotating member and the output voltage of a signal conditioner.

The encoder 25 shown in FIG. 2 emits a prescribed number of pulses for each prescribed angle of rotation and consequently feeds out a pulse signal proportionate to the rotating speed of the driving drum 16. This pulse signal is fed in a signal conditioner 32, which feeds out a voltage value proportionate to the revolution number of the driving drum 16. The relation between the revolution number per second (rps) of the driving drum 16 and the output voltage V of the signal conditioner 32 is as shown in FIG. 5. The output voltage of the signal conditioner 32 is forwarded to a comparator 33 and compared therein with the threshold to determine whether or not it surpasses the threshold. The output signal of the comparator 33 indicative of the result of this comparison is forwarded to the CPU 30. In short, in the case of the uneven rotation produced in the steady state, the comparator 33 of the type illustrated in the diagram issues a signal "Hi". On the occurrence of an uneven rotation surpassing the threshold, the comparator 33 issues a signal "Lo" and, in response to this signal, the CPU 30 detects the nipping of a recording paper sheet 11.

The signal conditioner 32 is adapted to forward the signal indicative of the rotational speed of the driving drum 16 through an A/D converter 34 to the CPU 30. To the stepping motor 23 which serves to operate the driving drum 16, the CPU 30 forwards through a motor-driving circuit 35 a drive signal for rotating this stepping motor 23 at a prescribed revolution number. This signal indicative of the set revolution number is also forwarded to a subtracter 36 in conjunction with the output signal from the A/D converter 34. The actual revolution number of the driving drum 16 detected by the encoder 25 is compared with the set revolution number in this subtracter 36.

The laser beam printer described above is endowed with means for detecting the thrust of a recording paper sheet 11 in between the driving drum 16 and the conveying roller 17 illustrated in FIG. 2 and, therefore, is capable of detecting the position of the recording paper sheet 11 without requiring use of a limit switch or other similar device.

The signal of this detection, when the image forming part 15 illustrated in FIG. 2 is utilized in the laser beam printer illustrated in FIG. 1, serves the purpose of controlling the timing for the inscription of an image on the recording paper sheet 11. In other words, when termination of the conveyance of the recording paper sheet 11 at the position of the conveying roller 17 is detected, a signal for starting scanning is delivered to the optical unit 19 after elapse of the time set on the timer in the CPU 30 and the optical unit 19, in response to the signal, projects on the recording paper sheet 11 a laser beam containing image data. It is also permissible to adopt means for discerning occurrence of a jam in the absence of detection of the thrust of the recording paper sheet 11 on elapse of a prescribed time after the recording paper sheet 11 has been played out of the magazine 12 by the paper feeding device 13.

This laser beam printer is further endowed with a function of utilizing the uneven rotation of the driving drum 16 in detecting the instant at which the recording paper sheet 11 departs from the part of pressed contact between the driving drum 18 and the conveying roller 16. This function also allows detection of passage of the trailing end of the recording paper sheet 11 through the image forming part 15. This detection may be utilized in setting the timing for starting the operation of the paper feeding device 13 and consequently effecting the conveyance of the next recording paper sheet 11 to the image forming part 15.

The present invention can be embodied also where a roll of recording paper is used in place of the magazine 12 loaded with separate recording paper sheets and the strip of recording paper played out of the roll is cut into separate sheets of a prescribed length and the separate sheets are forwarded to the image forming part 15 for inscription of an image thereon. In this embodiment, the problem of conveyance of a plurality of recording paper sheets in a superposed state cannot occur.

In the embodiment described so far, the encoder 25 monitors the uneven rotation of the driving drum 16 with reference to a prescribed value exceeding the uneven rotation of the driving drum 16 produced during the course of the steady state taken as the threshold X and, on detecting the occurrence of an output voltage falling below the threshold X discerns the fact that the recording paper sheet 11 has thrust in the driving drum 16. When a plurality of recording paper sheets are conveyed in a perfectly superposed state, the discernment just mentioned coupled with the magnitude of uneven rotation or disturbance allows determination of the number of recording paper sheets being forwarded in a superposed state.

Figure 6:
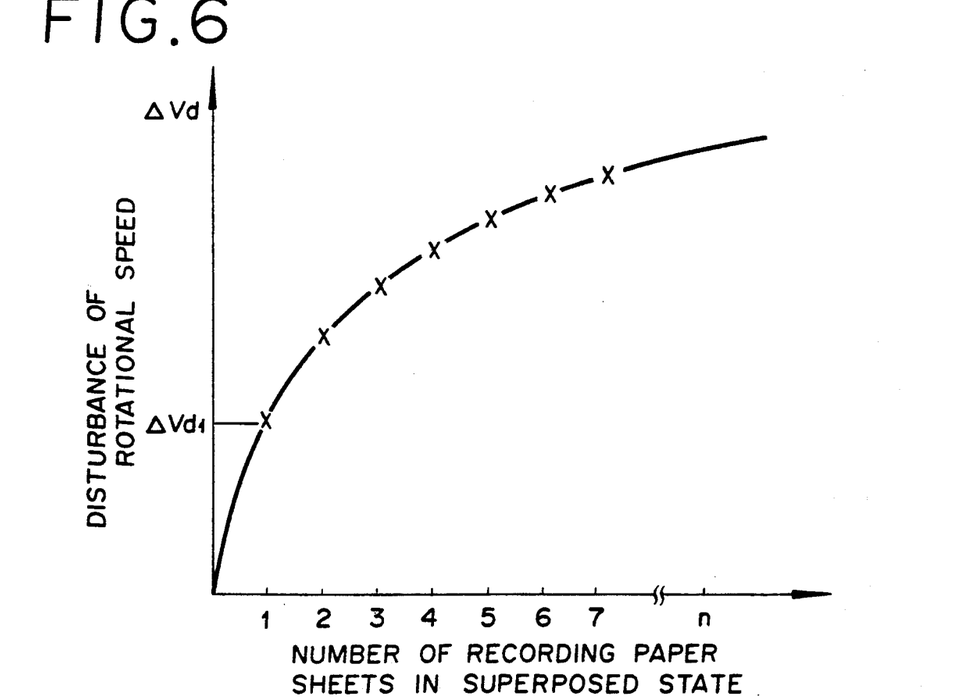
FIG. 6 is a graph showing the relation between the unevenness of rotation of a rotating member and the number of recording paper sheets.

FIG. 6 is a graph showing a typical relation between the number or recording paper sheets 11 supplied and the disturbance of variation caused in the uneven rotation or steady rotation of the rotating drum 16 by the thrust of the recording paper sheet therein. Thus, in the present laser beam printer, the number of recording paper sheets 11 which are nipped between the driving drum 16 and the conveying roller 17 can be detected in accordance with the magnitude of the uneven rotation. Now, therefore, the method for detecting the number of recording paper sheets conveyed as superposed in accordance with the magnitude of uneven rotation will be described below.

Let Vd stand for the rotational speed of the driving drum 16 kept in motion in the steady state, $\Delta$Vd for the uneven lotation produced when the recording paper sheet 11 thrusts in between the driving roller 16 and the conveying roller 17, and nd for the number of recording paper sheets 11 conveyed as superposed, and the relation of the following formula (1) will be satisfied.

$$\Delta VD \propto f(nd) \quad (1)$$

With respect to the first disturbance namely the uneven rotation A shown in FIG. 3, since the expression of the following formula exists:

$$\Delta Vd = \alpha \cdot f(nd) \quad (2)$$

the expression of the following formula is satisfied:

$$nd = \beta \cdot g(\Delta Vd) \quad (3)$$

In the formulas given above, $\alpha$ and $\beta$ each stand for a constant, f(x) stands for an arbitrary function to be determined based on the characteristic curve of FIG. 3, and g(x) stands for an inverse function thereof. By reading the value of $\Delta Vd$ from the output signal of the encoder 25, therefore, the introduction of a recording paper sheet 11 can be detected and, where a plurality of recording paper sheets 11 are conveyed in a superposed state, the number of the recording paper sheets can be calculated. In the illustrated embodiment, the formula (2) mentioned above represents an expression which corresponds to the characteristic curve shown in FIG. 6. Where the number of recording paper sheets 11 and the value for $\Delta Vd$ correspond to each other in the relation of 1 : 1, a higher-degree equation or a polynomial equation can be used for the present laser beam printer.

It is now assumed, for example, that the steady revolution number of the driving drum 16 is Vd as shown in FIG. 3 and the increment thereof is $\Delta Vd1$ as shown in FIG. 6. First, the steady revolution number $\Delta Vd$ of the driving drum 16 is read in at the time that the conveyance of a recording paper sheet 11 toward the driving drum 16 is started. Then, the peak value of the revolution number (Vd + $\Delta Vd1$) existing at the time that the recording paper sheet 11 thrusts in between the driving drum 16 and the conveying roller 17 is read in and the value of $\Delta Vd$ is calculated. Consequently, the number of recording paper sheets corresponding to the found value of $\Delta Vd$ is calculated as shown in FIG. 6. The level of the value of $\Delta Vd$ is variable within a certain range, depending on relevant conditions. So, a standard deviation $\delta$ is calculated in advance and the range within $\pm 2\delta$ of the standard deviation as the center is assumed as representing the pertinent number of recording paper sheets.

in the present embodiment, the control circuit is practically the same as that illustrated in FIG. 4. In this case, the numerical values of the numbers of recording paper sheets conveyed as superposed which correspond to the uneven rotation $\Delta Vd$ in the graph of FIG. 6 are stored in the ROM 31. Then, the number of recording paper sheets 11 conveyed in a superposed state is calculated by the CPU 30 in accordance with the signal transmitted from the A/D converter 34 to the CPU 30.

Figure 7:
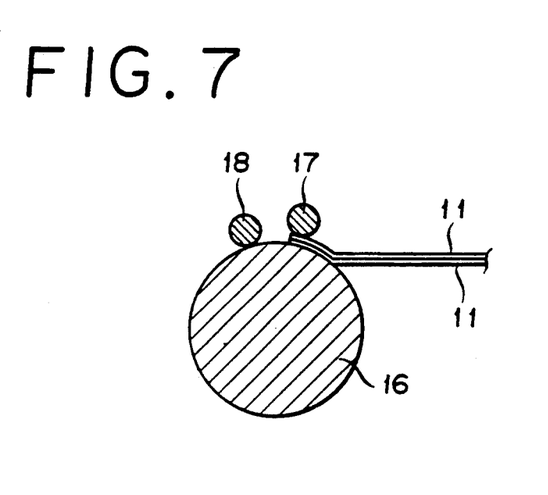
FIG. 7 is a cross section of an image forming part as posed in the condition in which a plurality of perfectly superposed recording paper sheets are conveyed to the image forming part.

In the present laser beam printer, therefore, the number of recording paper sheets 11 is detected or, where just one recording paper sheet 11 is conveyed, the timing for effecting the inscription of an image on the recording paper sheet 11 is controlled by the signal from the encoder 25. To be specific, when completion of the conveyance of a recording paper sheet 11 at the position of the conveying roller 17 is detected, the CPU 30 on elapse of the time set on the timer disposed inside the CPU 30 issues a signal to start scanning to the optical unit 19 and, in response to this signal, the optical unit 19 projects a laser beam containing image data to the recording paper sheet 11. Where a plurality of recording paper sheets 11 conveyed in a superposed state thrust into the position of the driving roller 16 as shown in FIG. 7, then the number of these recording paper sheets 11 is calculated, the printing operation is discontinued, the jam is eliminated, and the number of recording paper sheets conveyed in a superposed state is deducted from the total number of recording paper sheets 1 stowed in the magazine 12. When the result of the deduction from the total number falls below a prescribed number, this fact may be indicated on a display by way of informing the operator of the necessity for replenishing the magazine 12 with recording paper sheets. Otherwise, the current number of recording paper sheets remaining in the magazine may be kept indicated on a display 51, as schematically illustrated in FIG. 1. As a result, the management of the remaining supply paper sheets within the magazine can be facilitated.

Figure 9:
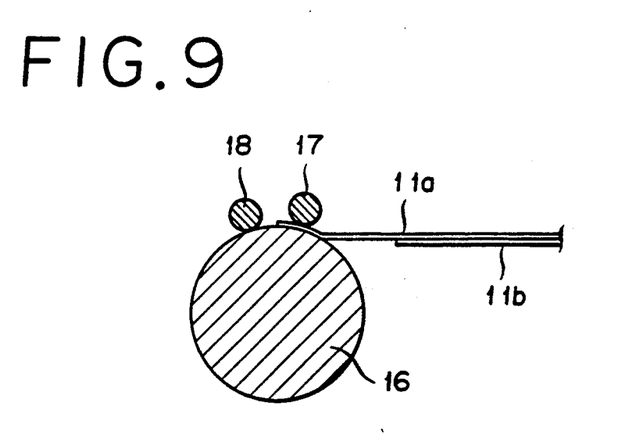
FIG. 9 is a cross section of an image forming part as posed in the condition in which a plurality of recording paper sheets are conveyed as superposed in such a manner that the leading ends thereof are in a mutually incoincident state.

The case in which a plurality of recording paper sheets 11 are conveyed in a superposed state to the image forming part 15 arises in a manner having the reading ends of the superposed recording paper sheets kept in a coincident state as illustrated in FIG. 7 or in a manner having them kept in a incoincident state as illustrated in FIG. 9.

A working example of the detection of the number of such superposed recording paper sheets conveyed in either of the manners mentioned above will be described below.

In this case, within a prescribed period following the start of the printing operation for starting the image forming operation, the conveyance of recording paper sheets 11 is monitored to detect the thrust of a recording paper sheet 11 and keep count of the numerical value n1 which represents the number of thrusts made.

Since two conveying rollers are disposed as illustrated in FIG. 2, the number of superposed sheets conveyed in a manner having the leading ends thereof kept in a coincident state is detected for every second thrust. By totaling such numbers nd, therefore, the total n of superposed sheets including both the number of superposed sheets conveyed in a manner having the leading ends thereof kept in a coincident state and those conveyed in a manner having them kept in an incoincident state can be obtained. Since the recording paper sheets are nipped in between the two conveying rollers 17, 18 on one part and the rotating drum 16 on the other part, the following formula is used for the calculation of the total n of superposed sheets:

$$n = (n\frac{1}{2}) + \sum_{K=1}^{n\frac{1}{2}} (ndK - 1) \quad (4)$$

in the formula, K stands for the number of conveyances of superposed sheets in a manner having the leading ends thereof kept in an incoincident state. The first term in the righthand member of this formula (4) corresponds to the conveyances of superposed sheets in a manner having the leading ends thereof kept in an incoincident state and the second term thereof corresponds to the conveyances of superposed sheets in a manner having the leading ends thereof kept in a coincident state.

in the present embodiment, the control circuit is substantially similar to that which is illustrated in FIG. 4.

Figure 8:
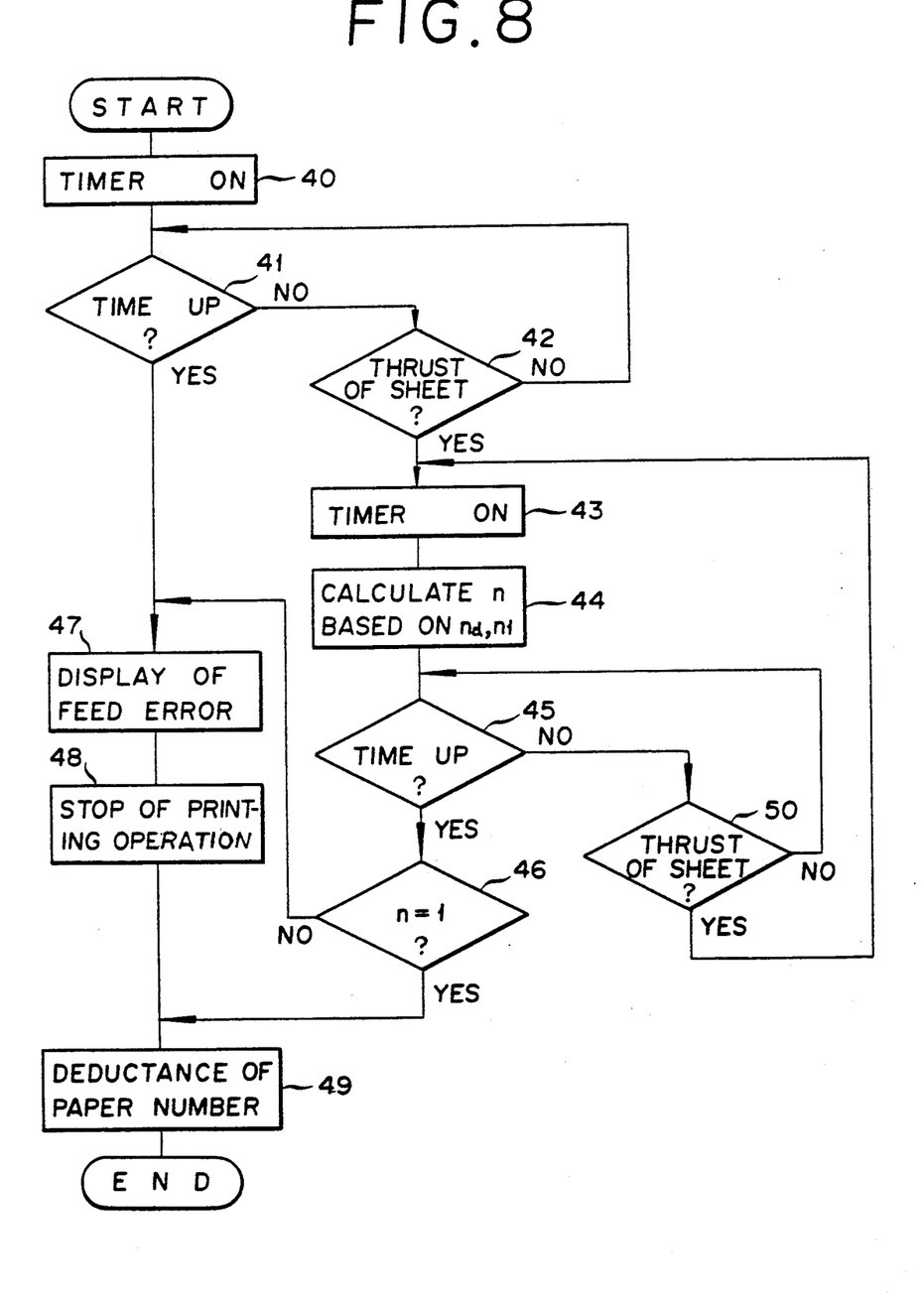
FIG. 8 is a flow chart showing the operating condition of a laser beam printer such that, no matter whether a plurality of recording paper sheets are conveyed in a perfectly superposed state or in a mutually incoincident state, the number of the recording paper sheets so conveyed as superposed is detected.

Now, the procedure of operation of the laser beam printer in the present embodiment will be described below with reference to the flow chart shown in FIG. 8.

When the printing operation starts, the timer is started at Step 40. When a recording paper sheet 11 thrusts in between the driving drum 16 and the conveying roller 17 (Step 42) before the expiration of the time set on the timer is judged at Step 41, the timer is started at Step 43. This timer counts the length of time required for conveying one recording paper sheet and repeats starting each time a recording paper sheet makes a thrust. Owing to this function, the number of all recording paper sheets including sheets conveyed as superposed with a delay and sheets similarly conveyed as superposed with a further delay and so on can be detected. The numerical value of n1 resulting from each increase in the uneven rotation due to the thrust of a recording paper sheet and the number nd of recording paper sheets which have made a thrust are calculated at Step 44. When the expiration of the time set on the timer is discerned in the ensuant state at Step 45, the judgment as to whether the number of recording paper sheets conveyed is one or more is exercised at Step 46.

When the conveyance of a plurality of recording paper sheets in a superposed state is discerned at Step 46, a feed error is displayed at Step 47 and the printing operation is stopped at Step 48. Then, at Step 49, the number n of recording paper sheets which have been conveyed thence is deducted from the original total number so as to display the number of recording paper sheets 11 still remaining in the magazine 12. By this function, the number of remaining sheets in the magazine 12 or the decrease of the number of sheets below a prescribed number can be displayed to facilitate the management of the number of recording paper sheets.

When a plurality of recording paper sheets 11b are conveyed in a superposed state in a manner having the leading ends thereof kept in an incoincident state as illustrated in FIG. 9, the fact that a recording paper sheet 11b has made a thrust while another recording paper sheet 11a is in the state of being conveyed is judged at Step 50 before the expiration of the time set on the timer is judged at Step 45. In this case, the processing is returned to Step 44, to add 1 to the numerical value of n1 mentioned above, calculate the number nd of recording paper sheets at the time of thrust, and calculate the total number n of conveyances of superposed sheets.

By adopting the function to detect the two types of conveyance of superposed sheets as described above, the number of recording paper sheets remaining in the magazine can be accurately managed.

The laser beam printer described above invariably has an encoder 25 attached to a driving drum 16. Optionally, the encoder may be attached directly to a driving motor 23 or incorporated as a built-in component in the motor. In this case, there is formed a closed-loop control which by nature produces a feedback to the motor. Even then, the detection of the uneven rotation due to the thrust of a recording paper sheet can be attained by adjusting the amount of control. While the illustrated embodiment represents a case in which the image forming part 15 shown in FIG. 2 is embodied in a laser beam printer, this invention can be applied to any of numerous types of image forming system such as, for example, a copying machine on the sole condition that a pair of rollers is utilized for the conveyance of recording paper sheets.

While this invention has been illustrated and described in accordance with preferred embodiments, it is recognized that variation and changes may be made and equivalents employed herein without departing from the invention as set forth in the claims.

What is claimed is:

1. A sheet detecting apparatus, comprising:
    sheet conveying means for conveying a sheet, said sheet conveying means including a first rotating member, a driving means for rotatively driving said first rotating member and a second rotating member held in pressed contact with said first rotating member and consequently allowed to follow a first rotating member rotation;
    detecting means for detecting a rotational speed of at least one of said first and second rotating members and for outputting a detection signal corresponding to said rotational speed; and
    discriminating means for judging, based on a change in said detection signal, that a leading end of a sheet has thrust in between said first rotating member and said second rotating member.

2. An apparatus according to claim 1, wherein said detection signal is a pulse signal generated as synchronized with the rotation of one of said first rotating member and said second rotating member, and wherein said discriminating means effects discrimination of the thrust of said sheet on a basis of a change in pulse intervals of said pulse signal.

3. An apparatus according to claim 1, wherein said detection signal is a signal indicating a magnitude of voltage corresponding to the rotational speed of said at least one of said first rotating member and said second rotating member, and said discriminating means effects a judgment by comparing a magnitude of voltage indicated by said detecting signal with a predetermined magnitude of voltage.

4. An apparatus according to claim 3, which further comprises timing means for starting to count a prescribed time when said discriminating means judges a thrust of a leading end of a sheet in between said first rotating member and said second rotating member, and calculating means for calculating a number of occasions of said judging of the thrust of the leading end of a sheet made by said discriminating means while said timing means is timing said prescribed time.

5. A sheet detecting apparatus comprising:
    sheet conveying means for conveying a sheet, said sheet conveying means including a first rotating member, a driving means for rotatively driving said first rotating member and a second rotating member held in pressed contact with said first rotating member and consequently allowed to follow a first rotating member rotation;
    detecting means for detecting a rotational speed of at least one of said first and second rotating members and for outputting a detection signal corresponding to said rotational speed; and
    discriminating means for judging, based on a change in said detection signal, that a trailing end of a sheet has departed from a gap between said first rotating member and said second rotating member.

6. A sheet detecting apparatus, comprising sheet conveying means for conveying a sheet, said sheet conveying means including a first rotating member, a driving means for rotatively driving said first rotating member and a second rotating member held in pressed contact with said first rotating member and consequently allowed to follow a first rotating member rotation;
    detecting means for detecting a rotational speed of at least one of said first and second rotating members and for outputting a detection signal corresponding to said rotational speed; and
    discriminating means for discriminating a thrust of a leading end of sheets in between said first rotating member and said second rotating member and, concurrently, for discriminating a number of sheets involved in said thrust based on said detection signal.

7. An apparatus according to claim 6, wherein said detection signal is a signal indicating a magnitude of voltage corresponding to a rotational speed of one of said first rotating member and said second rotating member, and said discriminating means discriminates a thrust of the leading and of a sheet by comparing a magnitude of voltage indicated by said detection signal with a predetermined magnitude of voltage and discriminates the number of sheets involved in said thrust on a basis of the magnitude of voltage indicated by said detection signal issued during said thrust.

8. A recording medium conveying apparatus, comprising:
   sheet conveying means for conveying a sheet, said sheet conveying means including a first rotating member, a driving means for rotatively driving said first rotating member and a second rotating member held in pressed contact with said first rotating member and consequently allowed to follow a first rotating member rotation;
   detecting means for detecting a rotational speed of at least one of said first and second rotating members and for outputting a detection signal corresponding to said rotational speed;
   discriminating means for discriminating a thrust of a leading end of sheets in between said first rotating member and said second rotating member and, concurrently, for discriminating a number of sheets involved in said thrust based on said detection signal;
   timing means for starting to clock a prescribed time when said discriminating means judges a thrust of the leading end of a sheet in between said first rotating member and said second rotating member;
   first calculating means for calculating a number of occasions of discrimination of the thrust of the leading end of a sheet made by said discriminating means while said timing means is counting said prescribed time; and
   second calculating means for calculating a number of sheets being conveyed on a basis of the discrimination made by said discriminating means and the calculating made by said first counting means.

9. An image forming apparatus for conveying recording paper sheets and for forming an image on said recording paper sheets, comprising:
   recording paper sheet conveying means for conveying said sheets, said recording paper sheet conveying means including a rotating driving roller and a following roller held in pressed contact with said driving roller and consequently allowed to rotate in concert with rotation of said driving roller;
   rotational speed detecting means for detecting a rotational speed of said driving roller;
   comparing means for comparing the rotational speed detected by said rotational speed detecting means with a prescribed rotational speed;
   discriminating means for discriminating a thrust of a leading end of a recording paper sheet in between said driving roller and said following roller in accordance with a result of the comparison made by said comparing means; and
   controlling means for controlling a timing for starting image formation on said recording paper sheet in response to a discrimination made by said discriminating means.

10. An apparatus according to claim 9, wherein said recording paper sheet conveying means is disposed in an image forming part.

11. An image forming apparatus for conveying recording paper sheets and for forming an image on said recording paper sheets, comprising:
    recording paper sheet conveying means for conveying said paper sheets, said recording paper sheet conveying means including a rotating driving roller and a following roller held in pressed contact with said driving roller and consequently allowed to rotate in concert with a rotation of said driving roller;
    rotational speed detecting means for detecting a rotational speed of said driving roller;
    comparing means for comparing the rotational speed detected by said rotational speed detecting means with a prescribed rotational speed;
    discriminating means for discriminating a thrust of a leading end of a recording paper sheet in between said driving roller and said following roller and, concurrently, for discriminating a number of recording paper sheets involved in said thrust in accordance with a result of comparison made by said comparing means;
    a display means for displaying an amount of unused recording paper sheets; and
    controlling means for controlling said display means in accordance with the number of recording paper sheets involved in said thrust.

* * * * *

UNITED STATES PATENT AND TRADEMARK OFFICE
CERTIFICATE OF CORRECTION

PATENT NO. : 5,097,273
DATED : March 17, 1992
INVENTOR(S) : Fuminori Moro, et al.

It is certified that error appears in the above-identified patent and that said Letters Patent is hereby corrected as shown below:

In col. 6, line 28, after "X" insert --,-- (comma).

In col. 8, line 50, change "in" to --In--.

In col. 10, line 30 (claim 4, last line), change "timing" to --counting--.

In col. 10, line 47 (claim 6, line 1), after "comprising" insert --:-- (colon).

In col. 11, line 27 (claim 8, line 20), change "clock" to --count--.

In col. 11, lines 38 and 39 (claim 8, lines 31 and 32), change "the calculating" to --a calculation--.

In col. 11, line 39 (claim 8, line 32), change "counting" to --calculating--.

Signed and Sealed this

Twenty-second Day of June, 1993

Attest:

MICHAEL K. KIRK

*Attesting Officer*   *Acting Commissioner of Patents and Trademarks*